United States Patent
Chen et al.

(10) Patent No.: US 9,519,100 B2
(45) Date of Patent: Dec. 13, 2016

(54) APPARATUS HAVING LIGHT GUIDE FOR ILLUMINATING A DISPLAY UNIT AND FOR ILLUMINATING A PATTERNED REGION

(71) Applicant: E Ink Holdings Inc., Hsinchu (TW)

(72) Inventors: I-Jeng Chen, Hsinchu (TW);
Sheng-Chieh Tai, Hsinchu (TW);
Tsai-Wei Shei, Hsinchu (TW);
Yao-Tsung Shih, Hsinchu (TW);
Yu-Nan Pao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 101 days.

(21) Appl. No.: 14/248,349

(22) Filed: Apr. 9, 2014

(65) Prior Publication Data

US 2015/0117055 A1    Apr. 30, 2015

(30) Foreign Application Priority Data

Oct. 24, 2013    (TW) .............................. 102138514 A

(51) Int. Cl.
*F21V 8/00* (2006.01)

(52) U.S. Cl.
CPC ............. *G02B 6/0093* (2013.01); *G02B 6/006* (2013.01); *G02B 6/0036* (2013.01); *G02B 6/0043* (2013.01); *G02B 6/0058* (2013.01)

(58) Field of Classification Search
CPC ..... G02B 6/0036; G02B 6/006; G02B 6/0063; G02B 6/0035; G02B 6/004; G02B 6/0041; G02B 6/0093

(Continued)

(56) References Cited

U.S. PATENT DOCUMENTS 5,867,772 A * 2/1999 Jonsson .............. H04M 1/0249
455/575.1
7,527,414 B2    5/2009 Hung et al.
(Continued)

FOREIGN PATENT DOCUMENTS

JP    WO 2013011813 A1 *  1/2013    ........... G02B 6/0043
TW    201104315    2/2011
(Continued)

OTHER PUBLICATIONS

"Office Action of Taiwan Counterpart Application", issued on Apr. 28, 2015, p. 1-p. 7, in which the listed references were cited.

*Primary Examiner* — Anh Mai
*Assistant Examiner* — Steven Horikoshi
(74) *Attorney, Agent, or Firm* — Jianq Chyun IP Office

(57) ABSTRACT

A display apparatus is provided. A display unit has a display region. A protecting cover has a patterned region, wherein the patterned region does not overlap the display region. A light guide plate is disposed between the display unit and the protecting cover and has a first light scattering region and a second light scattering region. The first light scattering region at least partially overlaps the display region, and the second light scattering region at least partially overlaps the patterned region. A light emitting unit emits a light beam to the light guide plate. After the light beam enters the light guide plate, a part of the light beam is scattered to the display region by the first light scattering region and another part of the light beam is scattered to the patterned region by the second light scattering region.

11 Claims, 4 Drawing Sheets

(58) Field of Classification Search
USPC .................................................. 362/602, 603
See application file for complete search history.

(56) References Cited

U.S. PATENT DOCUMENTS

| | | | |
|---|---|---|---|
| 7,828,472 B2 | 11/2010 | Liu et al. | |
| 8,353,614 B2 | 1/2013 | Pan et al. | |
| 8,366,308 B2 | 2/2013 | Chiu et al. | |
| 2006/0202968 A1* | 9/2006 | Skillman | G06F 1/1626 345/168 |
| 2007/0013664 A1* | 1/2007 | Lee | H01H 13/83 345/168 |
| 2009/0059618 A1* | 3/2009 | Onikiri | G02B 6/0053 362/603 |
| 2009/0067178 A1 | 3/2009 | Huang et al. | |
| 2009/0180282 A1 | 7/2009 | Aylward et al. | |
| 2010/0033988 A1 | 2/2010 | Chiu et al. | |
| 2011/0013376 A1 | 1/2011 | Kim et al. | |
| 2011/0141765 A1 | 6/2011 | Chang et al. | |
| 2012/0147627 A1 | 6/2012 | Pan | |
| 2012/0163033 A1 | 6/2012 | Chang et al. | |
| 2013/0063969 A1* | 3/2013 | Neugebauer | G02B 6/0036 362/603 |
| 2014/0146563 A1* | 5/2014 | Watanabe | G02B 6/0043 362/606 |

FOREIGN PATENT DOCUMENTS

| | | |
|---|---|---|
| TW | 201248289 | 12/2012 |
| TW | 201316221 | 4/2013 |

* cited by examiner

APPARATUS HAVING LIGHT GUIDE FOR ILLUMINATING A DISPLAY UNIT AND FOR ILLUMINATING A PATTERNED REGION

CROSS-REFERENCE TO RELATED APPLICATION

This application claims the priority benefit of Taiwan application serial no. 102138514, filed on Oct. 24, 2013. The entirety of the above-mentioned patent application is hereby incorporated by reference herein and made a part of this specification.

BACKGROUND OF THE INVENTION

Field of the Invention

The invention relates to an optical apparatus, and more particularly, to a display apparatus.

Description of Related Art

A light source module is usually used together with a display panel incapable of emitting light by itself, such as an electrophoretic display panel and a liquid crystal display panel, so as to allow a display apparatus to be watched in low light environments. For a transmissive liquid crystal display panel, a backlight module is usually disposed at back of the transmissive liquid crystal display panel to provide sufficient illumination for the transmissive liquid crystal display panel. On the other hand, for a transmissive reflective electrophoretic display panel (e.g., an electronic paper) or a reflective liquid crystal display panel, a frontlight module is usually disposed at front of the transmissive reflective electrophoretic display panel, so as to provide sufficient illumination for the transmissive liquid crystal display panel.

With current existing technology, it often requires an additional light source to provide illumination for outside a non-display area. Therefore, the additional light source may occupy a specific volume inside the display apparatus and prone to crowding-out of space for a light guide plate of a display area. On the other hand, in case illumination for the non-display area is used to light up a transmissive icon area, a upside emitting light source located below the transmissive icon area may be used to provide illumination for the non-display area. Therefore, a relatively larger space near the transmissive icon area is generally reserved for accommodating said light source. In this case, if the light guide plate providing illumination for the display area is also at the same direction, it is prone to crowding-out effect in which a light mixing area originally used by the light guide plate may be shorten, resulting in that the display area is prone to a hot spot phenomenon in terms of optical design. In other words, a non-uniform brightness may occur at positions closing to the light source.

More specifically, in a side incident type frontlight module, a light emitting element (such as a cold cathode fluorescent tube (CCFL)) may be disposed on an incident surface located on a lateral side of the light guide plate. After passing through the incident surface and entering the light guide plate, a light beam from the cold cathode fluorescent tube may be scattered by microstructures on the light guide plate into a planar light source having a uniform brightness to provide illumination for the display panel. With breakthrough in processing technology, a light emitting diode (LED) is gradually replacing the cold cathode fluorescent tube to serve as the light emitting element used in the frontlight module. In conventional design, a plurality of light emitting diodes are arranged near the incident surface of the light guide plate and spaced apart from one another. However, since the light emitting diodes are of a spot light source, a light intensity provided near the incident surface may not be uniformly distributed. Therein, a light region may be formed at positions facing right at the light emitting diodes, and a dark region may be formed between adjacent two of the light emitting diodes. As a result, a non-uniform distribution of the light intensity may occur on the light guide plate near the incident surface and known as the hot spot phenomenon. The hot spot phenomenon may be even more serious in case a light mixing distance is not long enough.

SUMMARY OF THE INVENTION

The invention is directed to a display apparatus capable of providing illumination for both a display region and a patterned region at the same time by using a light guide plate.

A display apparatus according to an embodiment of the invention includes a display unit, a protecting cover, a light guide plate and a light emitting unit. The display unit has a display region. The protecting cover has a patterned region, in which the patterned region does not overlap the display region. The light guide plate is disposed between the display unit and the protecting cover, and has a first light scattering region and a second light scattering region. The first light scattering region at least partially overlaps the display region, and the second light scattering region at least partially overlaps the patterned region. The light emitting unit emits a light beam to the light guide plate. A part of the light beam is scattered to the display region by the first light scattering region after entering the light guide plate, and another part of the light beam is scattered to the patterned region by the second light scattering region after entering the light guide plate.

In an embodiment of the invention, the light guide plate includes a first surface facing the protecting cover, a second surface facing the display unit and an incident surface connecting the first surface and the second surface, and the light beam from the light emitting unit enters the light guide plate through the incident surface.

In an embodiment of the invention, the second light scattering region is located between the first light scattering region and the incident surface.

In an embodiment of the invention, the first light scattering region and the second light scattering region are spaced apart by a distance.

In an embodiment of the invention, the light guide plate includes a plurality of first optical microstructures located on the first light scattering region, and a plurality of second optical microstructures located on the second light scattering region.

In an embodiment of the invention, the first optical microstructures are located on the second surface of the light guide plate, and the second optical microstructures are located on the first surface of the light guide plate.

In an embodiment of the invention, the display apparatus further includes a first transparent adhesive layer connected to the light guide plate and the protecting cover, and a second transparent adhesive layer connected to the light guide plate and the display unit.

In an embodiment of the invention, the first transparent adhesive layer and the second transparent adhesive layer expose the second light scattering region.

In an embodiment of the invention, the first transparent adhesive layer covers the second light scattering region, and the second transparent adhesive layer exposes the second light scattering region.

In an embodiment of the invention, the display unit is a reflective display panel.

In an embodiment of the invention, the display unit is an electrophoretic display panel.

In an embodiment of the invention, the display apparatus further includes a patterned layer located in the patterned region and disposed on a surface of the protecting cover facing the light guide plate.

In an embodiment of the invention, the display apparatus further includes a touch panel disposed between the protecting cover and the light guide plate, or disposed between the display unit and the light guide plate.

Based on above, according to the embodiments of the invention, the light guide plate of the display apparatus includes the first light scattering region and the second light scattering region corresponding to the display region and the patterned region, respectively, such that the light guide plate may be used to provide illumination for both the display unit and the patterned region. Accordingly, the display apparatus of the present embodiment may have a smaller volume.

To make the above features and advantages of the disclosure more comprehensible, several embodiments accompanied with drawings are described in detail as follows.

DESCRIPTION OF THE EMBODIMENTS

Figure 1A:
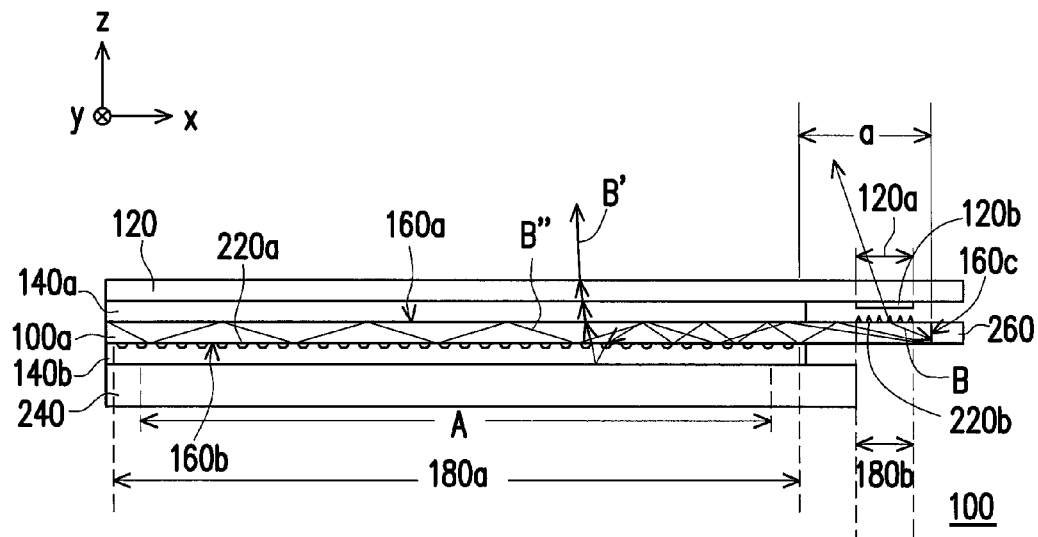
FIG. 1A is a side view of a display apparatus according to an embodiment of the invention.

FIG. 1A is a side view of a display apparatus according to an embodiment of the invention. Referring to FIG. 1A, in the present embodiment, a display apparatus 100 includes a display unit 240, a protecting cover 120, a light guide plate 100a and a light emitting unit 260. The display unit 240 has a display region A. The protecting cover 120 has a patterned region 120a, in which the patterned region 120a does not overlap the display region A. The light guide plate 100a is disposed between the display unit 240 and the protecting cover 120, and has a first light scattering region 180a and a second light scattering region 180b. The first light scattering region 180a at least partially overlaps the display region A, and the second light scattering region 180b at least partially overlaps the patterned region 120a. In addition, the light guide plate 100a includes a first surface 160a facing the protecting cover 120, a second surface 160b facing the display unit 240 and an incident surface 160c connecting the first surface 160a and the second surface 160b, and a light beam B from the light emitting unit 260 enters the light guide plate 100a through the incident surface 160c.

For clarity of the description regarding directions of each element and structure in the display apparatus 100, a rectangular coordinate system is defined to include an x-axis, a y-axis and a z-axis perpendicular to one another. Therein, an x-y plane is, for example, substantially parallel to the first surface 160a; a y-z plane is, for example, substantially parallel to the incident surface 160c; and an x-z plane is, for example, substantially perpendicular to the first surface 160a and the incident surface 160c. In the present embodiment, the first surface 160a is parallel to the second surface 160b.

Figure 1B:
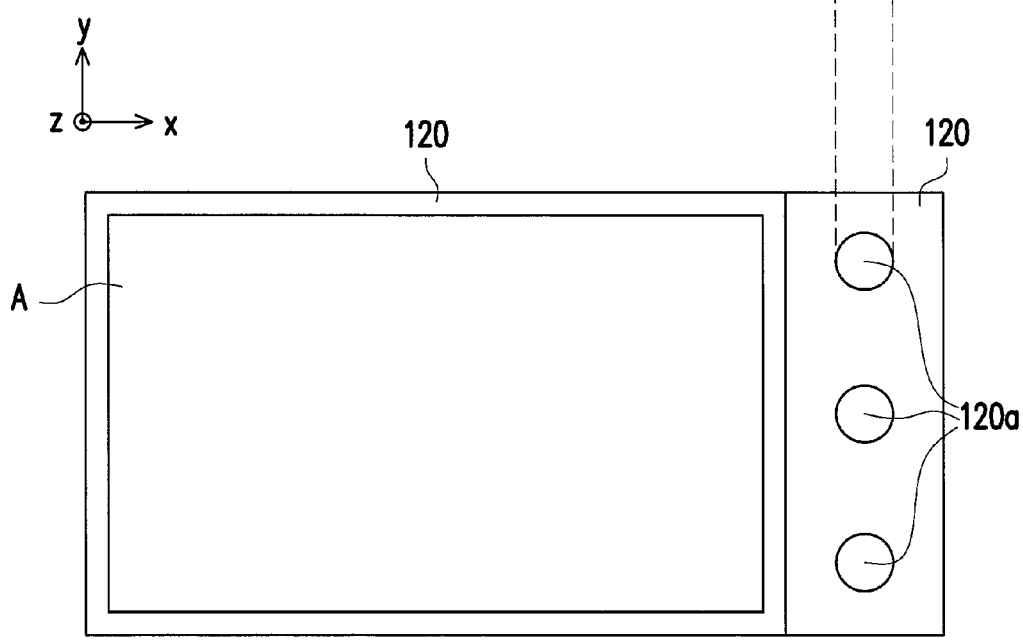
FIG. 1B is a top view of the embodiment of FIG. 1A.

FIG. 1B is a top view of the embodiment of FIG. 1A. Referring to FIG. 1A and FIG. 1B, in the present embodiment, the display apparatus 100 further includes a first transparent adhesive layer 140a and a second transparent adhesive layer 140b. The first transparent adhesive layer 140a is connected to the light guide plate 100a and the protecting cover 120, and the second transparent adhesive layer 140b is connected to the light guide plate 100a and the display unit 240. The first transparent adhesive layer 140a and the second transparent adhesive layer 140b expose the second light scattering region 180b. More specifically, referring to FIG. 1A and FIG. 1B, in the present embodiment, the display unit 240 is a reflective display panel. Therein, the reflective display panel 100 is, for example, an electrophoretic display panel or a liquid crystal display panel, but the invention is not limited thereto. The display region A is, for example, a region for displaying images by the display unit 240. The patterned region 120a is, for example, a region other than the display region A configured to dispose patterns, and the patterns are, for example, button patterns such as patterns for a home button, a return button, a menu button, a multi-functional button and so on. An amount of the patterned region 120a may be plural (it is illustrated with three of the patterned regions 120a in the present embodiment for example). Furthermore, in the present embodiment, the display unit 100 further includes a patterned layer 120b located in the patterned region 120a, and the patterned layer 120b is disposed on a surface of the protecting cover 120 facing the light guide plate 100a. Therein, the patterned layer 120b may be a printed layer having the button patterns.

More specifically, in the display apparatus 100 of the present embodiment, the second light scattering region 180b is located between the first light scattering region 180a and the incident surface 160c, and the first light scattering region 180a and the second light scattering region 180b are spaced apart by a distance. The light emitting unit 260 emits a light beam B to the light guide plate 100a, in which a part of the light beam B is scattered to the display region A by the first light scattering region 180a after entering the light guide plate 100a, and another part of the light beam B is scattered to the patterned region 120a by the second light scattering region 180b after entering the light guide plate 100a. In the present embodiment, the light guide plate 100a in the display apparatus 100 includes a plurality of first optical microstructures 220a located on the first light scattering region 180a, and a plurality of second optical microstructures 220b located on the second light scattering region 180b. More specifically, the first optical microstructures 220a are located on the second surface 160b of the light guide plate 100a, and the second optical microstructures 220b are located on the first surface 160a of the slight guide plate 100a. A distribution region of the second optical microstructures 220b may correspond to a disposing region of the patterned region 120a, and the distribution region of the second optical microstructures 220b may further includes a region where the first surface 160a of the light guide plate 100a corresponds to the patterned region 120a. In the present embodiment, the first optical microstructures 220a are illustrated in arc-dot bumps, for example, and the second optical microstructures 220b are illustrated in pyramidal bumps, for example, but the invention is not limited thereto. In other embodiments, the first optical microstructures 220a and the second optical microstructures 220b may also be dot bumps, dot recesses, arc bumps, arc recesses, pyramidal bumps, pyramidal recesses, polygon bumps, polygon recesses, bar bumps, bar recesses, circle bumps, circle recesses, concentric circle bumps, concentric circle recesses, stripe bumps, stripe recesses, or any combination of the above. When the light beam B enters the light guide plate 100a, the part of the light beam B is transmitted to the second optical microstructures 220b of the second light scattering region 180b, and scattered by the second optical microstructures 220b to the patterned region 120a for providing illumination for the patterned layer 120b in the patterned region 120a. Furthermore, in the present embodiment, the second light scattering region 180b is located between the first light scattering region 180a and the incident surface 160c, such that a distance a from the incident surface 160c to the first light scattering region 180a may be extended to increase a light mixing distance of the light emitting unit 260. Accordingly, the light intensity on a region between adjacent two optical axises may be increased to eliminate the dark region and reduce the hot spot phenomenon thereby improving an overall uniformity of the planar light source emitted by the display apparatus 100. Further, in the display region A, refractive indexes of the first transparent adhesive layer 140a and the second transparent adhesive layer 140b are less than a refractive index of a material of the light guide plate 100a. Therefore, the another part of the light beam B may be transmitted to the first optical microstructures 220a of the first light scattering region 180a through a total reflection or a reflection between the first surface 160a and the second surface 160b. On the other hand, in the present embodiment, the refractive indexes of the first transparent adhesive layer 140a and the second transparent adhesive layer 140b are greater than a refractive index of air, and more close to a refractive index of the light guide plate 100a as compared to the refractive index of air. Therefore, a boundary reflection between a material layer neighboring the light guide plate 100a and the light guide plate 100a may be reduced by replacing an air layer with the first transparent adhesive layer 140a and the second transparent adhesive layer 140b, such that a contrast issue of the display apparatus 100 caused by the boundary reflection may then be improved. A partial light beam B' is transmitted to the first optical microstructures 220a of the first light scattering region 180a and scattered to the display unit 240. Moreover, the partial light beam B" is transmitted to the first light scattering region 180a of the light guide plate 100a through the total reflection or the reflection.

It should be noted that, in the present embodiment, in case the light beam B provided to the patterned layer 120b by the second light scattering region 180b is sufficient, an area of the patterned layer 120b in the patterned region 120a may be slightly greater than or slightly less than an area of the second light scattering region 180b. The area of the patterned layer 120b in the patterned region 120a may also be equal to the area of the second light scattering region 180b, but the invention is not limited thereto. Furthermore, in the display apparatus 100 of other embodiments, the first transparent adhesive layer 140a covers the second light scattering region 180b, and the second transparent adhesive layer 140b exposes the second light scattering region 180b.

Figure 2:
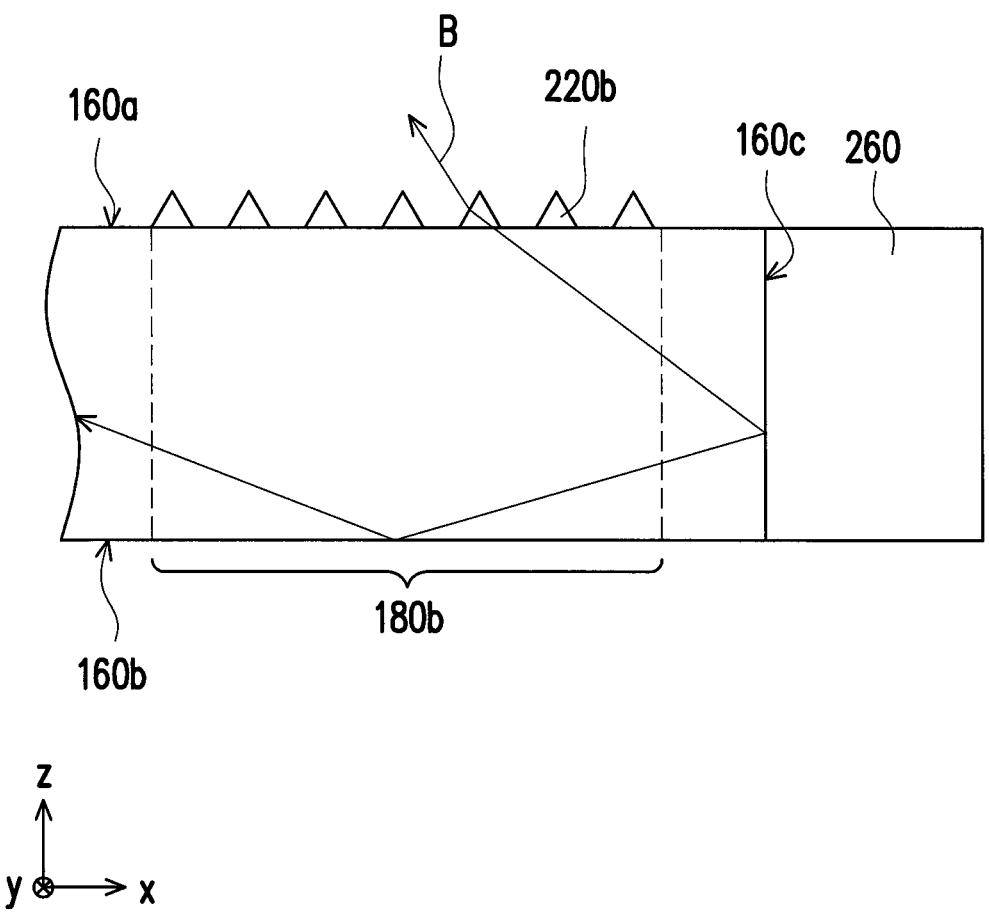
FIG. 2 is a partial side view illustrating the display apparatus of FIG. 1A.

FIG. 2 is a partial side view illustrating the second light scattering region of the display apparatus of FIG. 1B. Referring to FIG. 2, in the display apparatus 100 of the present embodiment, the light guide plate 100a has the second optical microstructures 220b located on the second light scattering region 180b, and the second optical microstructures 220b are located on the first surface 160a of the light guide plate 100a. More specifically, in the present embodiment, a shape of the second optical microstructures 220b may be a structure including a semisphere, an arc surface, a cone, a square, a wedge, bar, or any microstructures capable of destructing the total reflection of the light beam B, and the second optical microstructures 220b may be concave or convex to the surface of the light guide plate 100a.

It should be noted that, the invention is not intended to limit the first optical microstructures 220a to be located only on the second surface 160b of the light guide plate 100a, and the invention is not intended to limit the second optical microstructures 220b to be located only on the first surface 160a of the light guide plate 100a either. In other embodiments, the first optical microstructures 220a may also be located on the first surface 160a of the light guide plate 100a, or the first optical microstructures 220a may also be located on the first surface 160a and the second surface 160b of the light guide plate 100a at the same time. On the other hand, the second optical microstructures 220b may also be located on the second surface 160b of the light guide plate 100a, or the second optical microstructures 220b may also be located on the first surface 160a and the second surface 160b of the light guide plate 100a at the same time.

Figure 3:
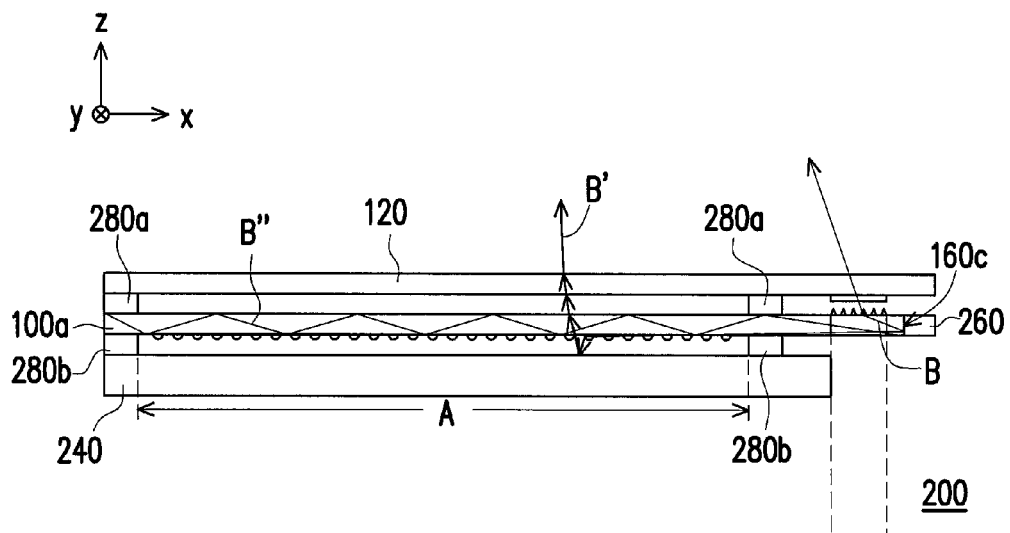
FIG. 3 is a side view illustrating a display apparatus according to another embodiment.
Figure 4:
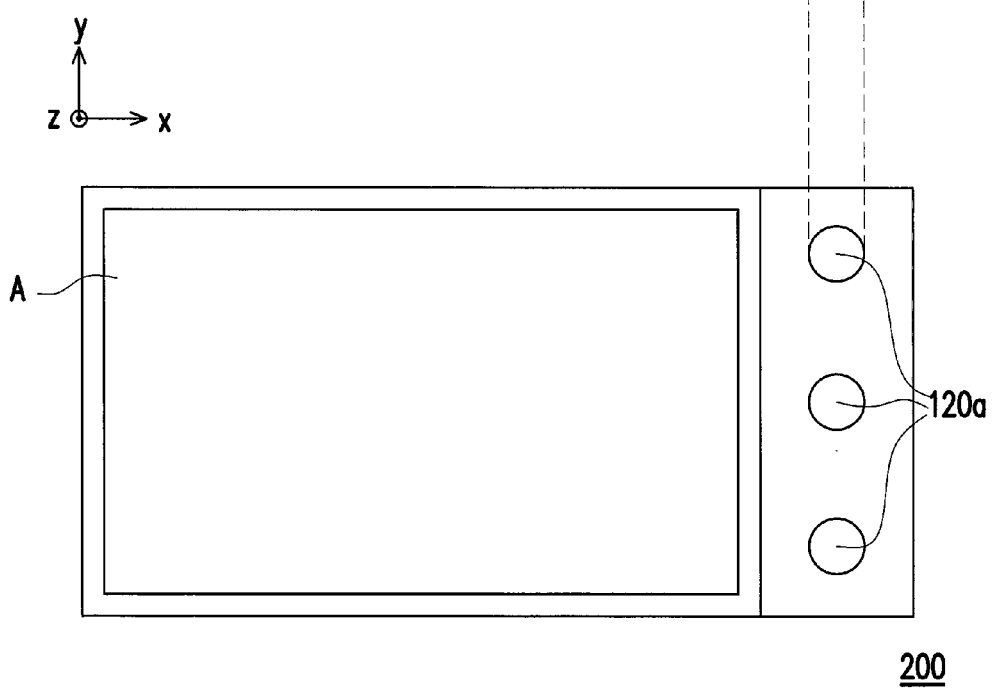
FIG. 4 is a top view illustrating the display apparatus of the embodiment of FIG. 3.

FIG. 3 is a side view illustrating a display apparatus according to another embodiment, and FIG. 4 is a top view illustrating the display apparatus of the embodiment of FIG. 3. A display apparatus 200 of the present embodiment is similar to the display apparatus 100 of FIG. 1A, a difference between the two is described below. Referring to FIG. 3 and FIG. 4, in the present embodiment, the display apparatus 200 further includes a first supporting member 280a and a second supporting member 280b. The first supporting member 280a is connected between the protecting cover 120 and the light guide plate 100a, and the second supporting member 280b is connected between the light guide plate 100a and the display unit 240. In the present embodiment, the air layer is provided between the protecting cover 120 and the light guide plate 100a, and the air layer is also provided between the light guide plate 100a and the display unit 240. Since a refractive index of the air layer is less than that of the light guide plate 100a, the light beam B provide by the light emitting unit 260 may be transmitted between the first surface 160a and the second surface 160b of the light guide plate 100a through the total reflection or the reflection.

Figure 5:
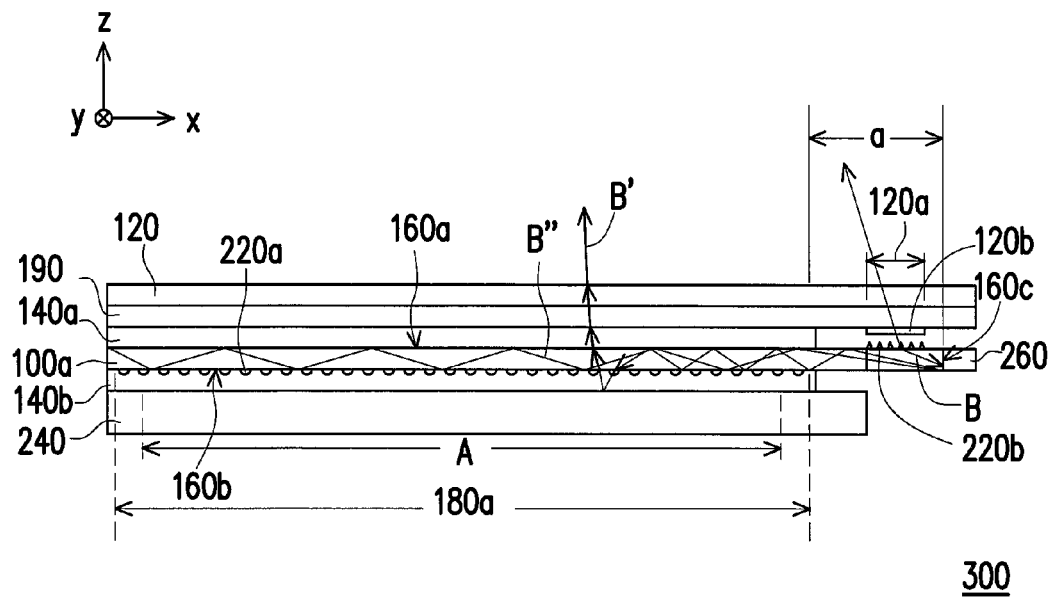
FIG. 5 is a side view of a display apparatus according to yet another embodiment of the invention.

FIG. 5 is a side view of a display apparatus according to yet another embodiment of the invention. Referring to FIG. 5, a display apparatus 300 of the present embodiment is similar to the display apparatus 100 of FIG. 1A, and a difference between the two is that, the display apparatus 300 of the present embodiment further includes a touch panel 190 disposed between the protecting cover 120 and the light guide plate 100a. The touch panel 190 may be, for example, a capacitive touch panel, a resistance touch panel, an optical touch panel or other appropriate touch panels. The touch panel 190 allows the display apparatus 300 to provide touch functions.

Figure 6:
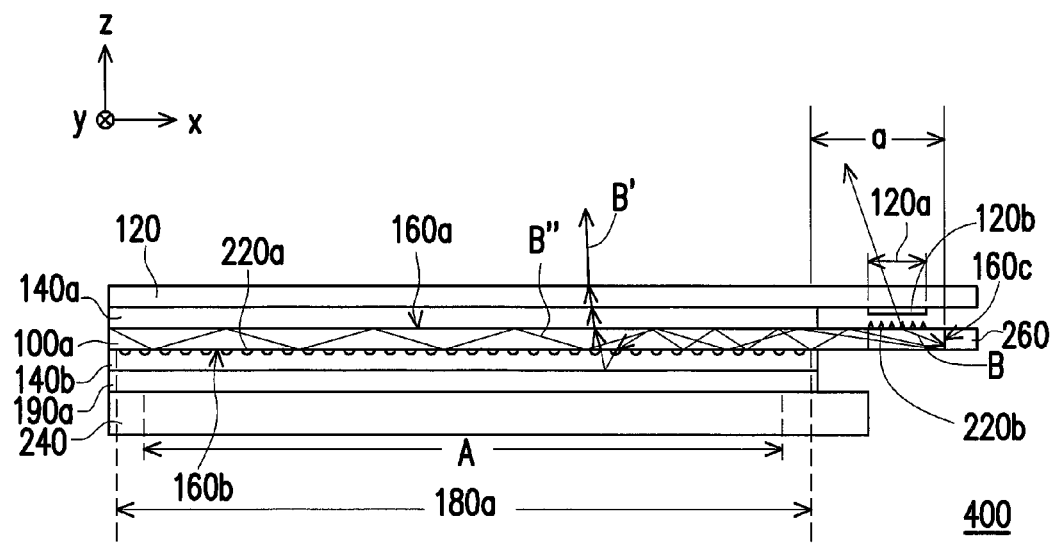
FIG. 6 is a side view of a display apparatus according to still another embodiment of the invention.

FIG. 6 is a side view of a display apparatus according to still another embodiment of the invention. Referring to FIG. 6, a display apparatus 400 of the present embodiment is similar to the display apparatus 100 of FIG. 1A, and a difference between the two is that, the display apparatus 400 of the present embodiment further includes a touch panel 190a disposed between the display unit 240 and the light guide plate 100a. The touch panel 190a may be, for example, a capacitive touch panel, a resistance touch panel, an optical touch panel or other appropriate touch panels. The touch panel 190a allows the display apparatus 400 to provide touch functions.

In summary, according to the embodiments of the invention, the light guide plate of the display apparatus includes the first light scattering region and the second light scattering region corresponding to the display region and the patterned region, respectively, such that the light guide plate may be used to provide illumination for both the display unit and the patterned region. Accordingly, the display apparatus of the present embodiment may have a smaller volume. Moreover, in the embodiments of the invention, since the second light scattering region is located between the first light scattering region and the incident surface, the light mixing distance from the incident surface to the first light scattering region may be extended, so that the problem upon the non-uniform brightness (i.e., the hot spot phenomenon) on the light guide plate closing to the incident surface may reduced to further improve a display quality of the display apparatus.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A display apparatus, comprising:
a display unit having a display region;
a protecting cover having a patterned region, wherein a portion of the protecting cover overlaps the display region and another portion of the protecting cover having the patterned region does not overlap the display region;
a light guide plate disposed between the display unit and the protecting cover, and having a first light scattering region and a second light scattering region, wherein the first light scattering region at least partially overlaps the display region, and the second light scattering region at least partially overlaps the patterned region;
a light emitting unit emitting a light beam to the light guide plate, wherein a part of the light beam is scattered to the display region by the first light scattering region after entering the light guide plate, and another part of the light beam is scattered to the patterned region by the second light scattering region after entering the light guide plate;
a first transparent adhesive layer connecting the light guide plate and the protecting cover; and
a second transparent adhesive layer connecting the light guide plate and the display unit, wherein the first transparent adhesive layer and the second transparent adhesive layer are located outside the second light scattering region.

2. The display apparatus of claim 1, wherein the light guide plate comprises a first surface facing the protecting cover, a second surface facing the display unit and an incident surface connecting the first surface and the second surface, and the light beam from the light emitting unit enters the light guide plate through the incident surface.

3. The display apparatus of claim 2, wherein the second light scattering region is located between the first light scattering region and the incident surface.

4. The display apparatus of claim 3, wherein the first light scattering region and the second light scattering region are spaced apart by a distance.

5. The display apparatus of claim 2, wherein the light guide plate comprises:
a plurality of first optical microstructures located on the first light scattering region; and
a plurality of second optical microstructures located on the second light scattering region.

6. The display apparatus of claim 5, wherein the first optical microstructures are located on the second surface of the light guide plate, and the second optical microstructures are located on the first surface of the light guide plate.

7. The display apparatus of claim 1, wherein the display unit is a reflective display panel.

8. The display apparatus of claim 1, wherein the display unit is an electrophoretic display panel.

9. The display apparatus of claim 1, further comprising a patterned layer located in the patterned region and disposed on a surface of the protecting cover facing the light guide plate.

10. The display apparatus of claim 1, further comprising a touch panel disposed between the protecting cover and the light guide plate, or disposed between the display unit and the light guide plate.

11. A display apparatus, comprising:
a display unit having a display region;
a protecting cover having a patterned region, wherein a portion of the protecting cover overlaps the display region and another portion of the protecting cover having the patterned region does not overlap the display region;
a light guide plate disposed between the display unit and the protecting cover, and having a first light scattering region and a second light scattering region, wherein the first light scattering region at least partially overlaps the display region, and the second light scattering region at least partially overlaps the patterned region;
a light emitting unit emitting a light beam to the light guide plate, wherein a part of the light beam is scattered to the display region by the first light scattering region after entering the light guide plate, and another part of the light beam is scattered to the patterned region by the second light scattering region after entering the light guide plate;
a first transparent adhesive layer connecting the light guide plate and the protecting cover; and
a second transparent adhesive layer connecting the light guide plate and the display unit, wherein the first transparent adhesive layer covers the second light scattering region, and the second transparent adhesive layer is located outside the second light scattering region.

* * * * *